J. PIERPONT.
Wheel-Cultivator.
No. 69,697.
Patented Oct. 8, 1867.
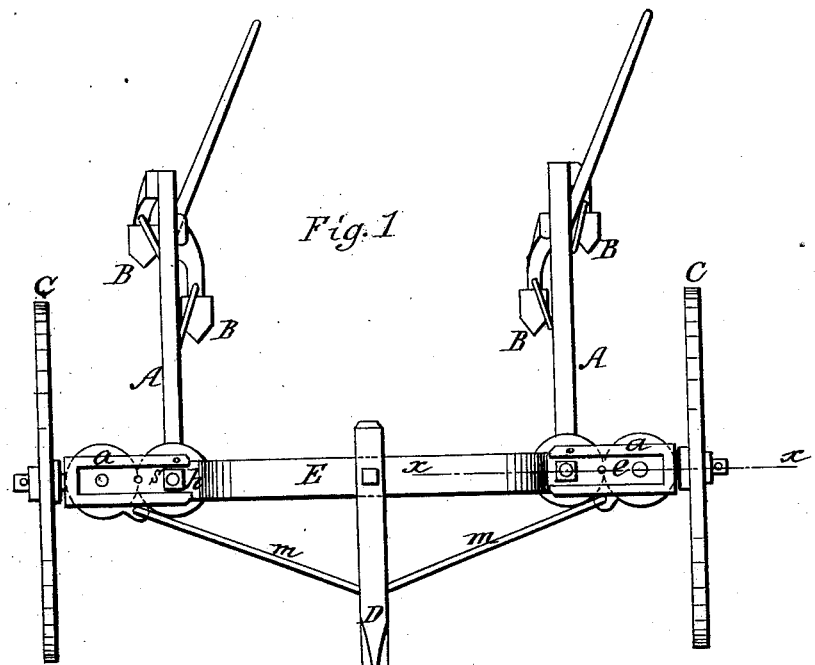
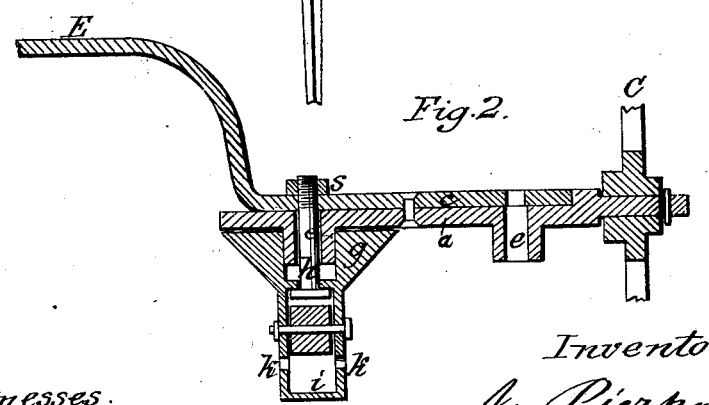
Witnesses
Theo. Tische
Wm Dean Overell
Inventor
J. Pierpont
Per Munn & Co.
Attys

UNITED STATES PATENT OFFICE.

JOSHUA PIERPONT, OF LA HARPE, ILLINOIS, ASSIGNOR TO HIMSELF AND SIDNEY S. TUTTLE, OF SAME PLACE.

IMPROVEMENT IN CULTIVATOR-COUPLINGS.

Specification forming part of Letters Patent No. 69,697, dated October 8, 1867.

*To all whom it may concern:*

Be it known that I, JOSHUA PIERPONT, of La Harpe, in the county of Hancock and State of Illinois, have invented a new and useful Improvement in Cultivator-Couplings; and I do hereby declare that the following is a full, clear, and exact description thereof, which will enable others skilled in the art to make and use the same, reference being had to the accompanying drawings, forming part of this specification.

Figure 1 is a top view of my improvement in the axle and coupling of cultivators. Fig. 2 is a detached sectional view of the same, taken in the line $x\ x$, Fig. 1.

Similar letters of reference indicate corresponding parts.

This invention relates to an improvement in the axle and coupling of cultivators; and it consists in casting the arms of the axle with a longitudinal groove on the upper side of each for receiving the ends of a wrought-iron connecting-bar, and a box or boxes on the under side for receiving a turn-table clevis, as hereinafter described.

The drawings represent a cultivator with plow-beams A A for working on both sides of a row of corn or other plants. B B are plows or shovels; C C, wheels, and D the draft-pole. The axle-arms $a\ a$ are made flat, of cast-iron, and have a deep groove on the upper side for receiving the ends $c\ c$ of a wrought-iron connecting-bar, E, secured by rivets or otherwise. On the under side of the arms $a\ a$ are cast one or more nipples or projecting boxes, $e\ e$, which fit into the head $g$ of the clevis on the end of the plow-beam. The clevis is secured to the under side of an axle-arm, $a$, by a screw-bolt, $h$, passing up through the head $g$ and the box $e$, secured with a nut, $s$, upon the end $c$ of the connecting-bar E, through which the bolt $h$ also passes, as clearly shown in Fig. 2. The clevis is made of cast-iron, and for greater strength and lightness the sides $k\ k$ are connected at the bottom by a cross-piece, $i$. The clevis-head $g$ turns on the nipple $e$ that receives the strain of the plow-beam to relieve the bolt, which is thus protected against the danger of breaking, while the cultivators are held steady, and admit of side motion freely. On the front sides of the arms $a\ a$ lugs are cast with holes in them for holding the ends of the pole-braces $m\ m$. This arrangement of the coupling, by means of a turn-table clevis and the arm of an axle, combines simplicity, utility, and durability.

Having thus described my invention, what I claim as new, and desire to secure by Letters Patent, is—

1. The turn-table clevis with the head $g$, in combination with the axle-arm $a$, both constructed and operating substantially as and for the purpose herein described.

2. The combination of the clevis and the axle-arm $a$ with the connecting-bar E, arranged and operating as and for the purpose described.

The above specification of my invention signed by me this 22d day of July, 1867.

JOSHUA PIERPONT.

Witnesses:
 CHARLES KELTER,
 LEWIS DUTTON.